United States Patent [19]

Gugumus

[11] Patent Number: 5,719,217
[45] Date of Patent: Feb. 17, 1998

[54] SYNERGISTIC STABILISER MIXTURE

[75] Inventor: François Gugumus, Allschwil, Switzerland

[73] Assignee: Ciba Specialty Chemicals Corporation, Tarrytown, N.Y.

[21] Appl. No.: 547,190

[22] Filed: Oct. 24, 1995

[30] Foreign Application Priority Data

Oct. 28, 1994 [EP] European Pat. Off. ............ 94810621
Apr. 20, 1995 [CH] Switzerland ............................ 1133/95

[51] Int. Cl.$^6$ ........................................................ C08K 5/34
[52] U.S. Cl. .......................... 524/100; 524/100; 524/102; 524/103
[58] Field of Search ........................ 524/95, 100, 102, 524/103

[56] References Cited

U.S. PATENT DOCUMENTS

| | | | |
|---|---|---|---|
| 3,251,904 | 5/1966 | Souder et al. | |
| 3,808,180 | 4/1974 | Owens | 260/885 |
| 3,929,933 | 12/1975 | Gallagher | 260/876 |
| 3,969,431 | 7/1976 | Gallagher | 260/876 |
| 4,086,204 | 4/1978 | Cassandrini et al. | 260/45.8 |
| 4,331,586 | 5/1982 | Hardy | 525/186 |
| 4,340,534 | 7/1982 | Wiezer et al. | 524/99 |
| 4,477,615 | 10/1984 | Raspanti et al. | 524/100 |
| 4,692,486 | 9/1987 | Gugumus | 524/100 |
| 4,780,494 | 10/1988 | Hess et al. | 524/99 |
| 4,863,981 | 9/1989 | Gugumus | 524/97 |
| 4,929,652 | 5/1990 | Gugumus | 529/102 |
| 4,957,953 | 9/1990 | Kikkawa et al. | 524/99 |
| 4,985,479 | 1/1991 | Nagasaki et al. | 524/96 |
| 5,021,485 | 6/1991 | Gugumus | 524/100 |
| 5,221,713 | 6/1993 | Kempner et al. | 525/71 |
| 5,380,785 | 1/1995 | Ngoc et al. | 524/504 |
| 5,439,959 | 8/1995 | Raspanti | 524/100 |

FOREIGN PATENT DOCUMENTS

| | | |
|---|---|---|
| 0028318 | 10/1980 | European Pat. Off. |
| 0252877 | 6/1987 | European Pat. Off. |
| 345220 | 12/1989 | European Pat. Off. |
| 0449685 | 3/1991 | European Pat. Off. |
| 0632092 | 7/1994 | European Pat. Off. |
| 2267499 | 12/1993 | United Kingdom |
| 9212201 | 7/1992 | WIPO |
| 9422946 | 10/1994 | WIPO |

OTHER PUBLICATIONS

Res. Disclosure No. 345, Jan. 1993 pp. 32-34.
Material Safety Data Sheet—Cas. No. 136504-96-6.
Ranby et al., Photodegradation, Photo-Oxidation and Photostabilization of Polymers, pp. 418-422.

*Primary Examiner*—Kriellion S. Morgan
*Attorney, Agent, or Firm*—David R. Crichton; Victoria M. Malia

[57] ABSTRACT

A stabilizer mixture comprising, for example, a compound of formula I and a compound of formula III

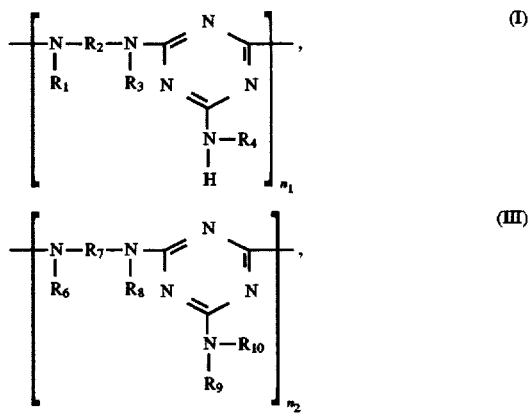

wherein $n_1$ and $n_2$ may be an integer from 2 to 20, $R_1$, $R_3$, $R_6$ and $R_8$ may each be independently of one another hydrogen, $C_1$-$C_4$alkyl or a group of formula II

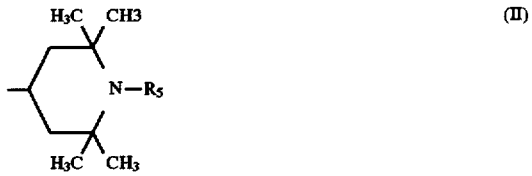

wherein $R_5$ may be hydrogen or methyl, $R_2$ and $R_7$ are each independently of the other $C_2$-$C_6$alkylene, $R_4$ may be $C_1$-$C_{10}$alkyl or cyclohexyl, $R_9$ and $R_{10}$ may each be independently of the other $C_1$-$C_8$alkyl or a group of formula II, or $R_9$ and $R_{10}$, together with the linking nitrogen atom, are morpholino.

13 Claims, No Drawings

SYNERGISTIC STABILISER MIXTURE

The present invention relates to a stabiliser system comprising two specific polymeric polyalkylpiperidine derivatives, the use thereof for stabilising organic material, and to the organic material protected with said stabiliser system against thermal, oxidative or light-induced degradation.

In U.S. Pat. No. 4,692,486, U.S. Pat. No. 4,863,981, U.S. Pat. No. 4,957,953, WO-A-92/12 201, EP-A-449 685, EP-A-632 092, GB-A-2 267 499 and in Research Disclosure 34549 (January 1993) there are disclosed stabiliser mixtures that contain two polyalkylpiperidine derivatives.

In one of its aspects, the invention relates to a stabiliser mixture comprising at least two different compounds selected from the group of components a), b), c) and d), wherein
component a) is at least one compound of formula I

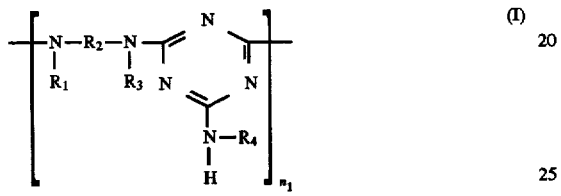

wherein $R_1$, $R_3$ and $R_4$ are each independently of one another $C_1$–$C_{12}$alkyl, $C_5$–$C_{12}$cycloalkyl, $C_1$–$C_4$alkyl-substituted $C_5$–$C_{12}$cycloalkyl, phenyl, phenyl substituted by —OH and/or $C_1$–$C_{10}$alkyl, $C_7$–$C_9$phenylalkyl, $C_7$–$C_9$phenylalkyl which is substituted in the phenyl nucleus by —OH and/or $C_1$–$C_{10}$alkyl; or a group of formula II

wherein $R_5$ is hydrogen, $C_1$–$C_8$alkyl, O, —$CH_2CN$, $C_3$–$C_6$alkenyl, $C_7$–$C_9$phenylalkyl, $C_7$–$C_9$phenylalkyl which is substituted in the phenyl nucleus by $C_1$–$C_4$alkyl; or $C_1$–$C_8$acyl, and $R_1$ and $R_3$ are additionally each independently of the other hydrogen, $R_2$ is $C_2$–$C_{18}$alkylene, $C_5$–$C_7$cycloalkylene or $C_1$–$C_4$alkylene-di($C_5$–$C_7$cycloalkylene), or $R_1$, $R_2$ and $R_3$, together with the linking nitrogen atoms, form a 5- to 10-membered heterocyclic ring, $n_1$ is an integer from 2 to 50 and at least one of $R_1$, $R_3$ and $R_4$ is a group of formula II;

component b) is at least one compound of formula III

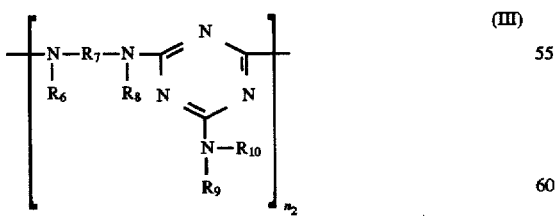

wherein $R_6$ and $R_8$ are each independently of the other hydrogen, $C_1$–$C_{12}$alkyl, $C_5$–$C_{12}$cycloalkyl, $C_1$–$C_4$alkyl-substituted $C_5$–$C_{12}$cycloalkyl, phenyl, phenyl substituted by —OH and/or $C_1$–$C_{10}$alkyl, $C_7$–$C_9$phenylalkyl, $C_7$–$C_9$phenylalkyl which is substituted in the phenyl nucleus by —OH and/or $C_1$–$C_{10}$alkyl; or a group of formula II, $R_7$ is $C_2$–$C_{18}$alkylene, $C_5$–$C_7$cycloalkylene or $C_1$–$C_4$alkylene-di($C_5$–$C_7$cycloalkylene), or $R_6$, $R_7$ and $R_8$ together with the linking nitrogen atoms form a 5- to 10-membered heterocyclic ring, $R_9$ and $R_{10}$ are each independently of the other $C_1$–$C_{12}$alkyl, $C_5$–$C_{12}$cycloalkyl, $C_1$–$C_4$alkyl-substituted $C_5$–$C_{12}$cycloalkyl, phenyl, phenyl substituted by —OH— and/or $C_1$–$C_{10}$alkyl, $C_7$–$C_9$phenylalkyl, $C_7$–$C_9$phenylalkyl which is substituted in the phenyl nucleus by —OH and/or $C_1$–$C_{10}$alkyl; or a group of formula II, or $R_9$ and $R_{10}$, together with the linking nitrogen atom, form a 5- to 10-membered heterocyclic ring, $n_2$ is an integer from 2 to 50 and at least one of $R_6$, $R_8$, $R_9$ and $R_{10}$ is a group of formula (II);

component c) is a product obtainable by reacting a product, obtained by reaction of a polyamine of formula IVa with cyanuric chloride, with a compound of formula IVb

$$H_2N-(CH_2)_{n_3'}-NH-(CH_2)_{n_3''}-NH-(CH_2)_{n_3'''}-NH_2 \quad (IVa)$$

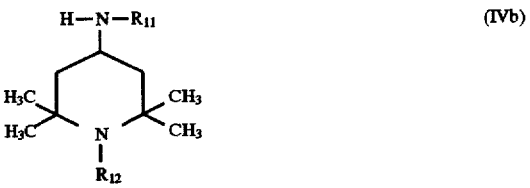

wherein $n_3'$, $n_3''$ and $n_3'''$ are each independently of one another an integer from 2 to 12, $R_{11}$ is hydrogen, $C_1$–$C_{12}$alkyl, $C_5$–$C_{12}$cycloalkyl, phenyl or $C_7$–$C_9$phenylalkyl, and $R_{12}$ has one of the meanings given for $R_5$;

component d) is at least one compound of formulae Va and Vb

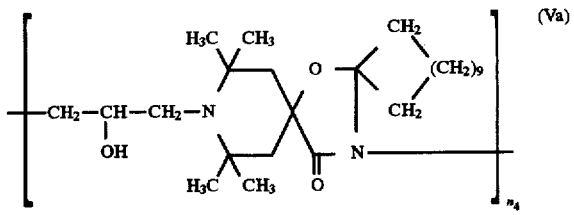

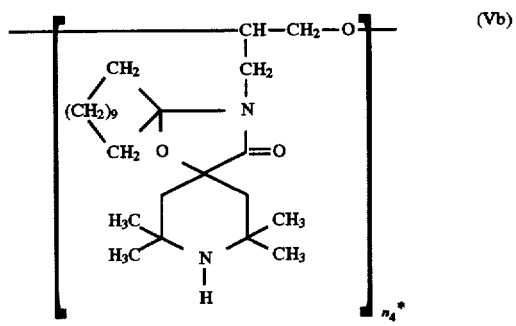

wherein $n_4$ and $n_4^*$ are each independently of the other an integer from 2 to 50;

with the proviso that the stabiliser mixture comprising at least one compound of formula I, at least one compound of formula III and at least one compound of formula VI,

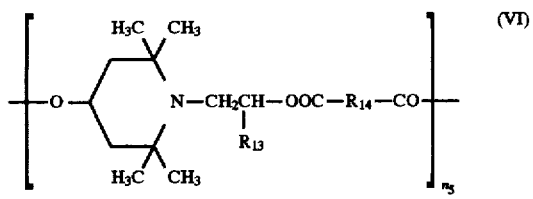

wherein $R_{13}$ is hydrogen or methyl, $R_{14}$ is a direct bond or $C_1$–$C_{10}$alkylene and $n_5$ is an integer from 2 to 100, is excluded.

Alkyl containing up to 12 carbon atoms is typically methyl, ethyl, propyl, isopropyl, n-butyl, tert-butyl, pentyl, hexyl, octyl, 1,1,3,3-tetramethylbutyl, nonyl, decyl, undecyl or dodecyl. One of the preferred meanings of $R_1$, $R_3$, $R_6$ and $R_8$ is $C_1$–$C_4$alkyl. $R_{10}$ and $R_{11}$ are preferably $C_1$–$C_8$alkyl, more particularly n-butyl. $R_4$ is preferably $C_1$–$C_{10}$alkyl, more particularly 1,1,3,3-tetramethylbutyl. One of the preferred meanings of $R_5$ is $C_1$–$C_4$alkyl, more particularly methyl.

$C_5$–$C_{12}$Cycloalkyl is typically cyclopentyl, cyclohexyl, cycloheptyl, cyclooctyl, cyclodecyl or cyclododecyl. $C_5$–$C_7$Cycloalkyl is preferred, more particularly cyclohexyl. Another preferred meaning of $R_4$ is cyclohexyl.

$C_1$–$C_4$Alkyl-substituted $C_5$–$C_{12}$cycloalkyl is typically methylcyclohexyl or dimethylcyclohexyl.

Phenyl substituted by —OH and/or $C_1$–$C_{10}$alkyl is typically methylphenyl, dimethylphenyl, trimethylphenyl, tert-butylphenyl or 3,5-di-tert-butyl-4-hydroxyphenyl.

$C_7$–$C_9$Phenylalkyl is preferably benzyl.

$C_7$–$C_9$Phenylalkyl substituted in the phenyl nucleus by —OH and/or $C_1$–$C_{10}$alkyl is typically methylbenzyl, dimethylbenzyl, trimethylbenzyl, tert-butylbenzyl or 3,5-di-tert-butyl-4-hydroxybenzyl.

$C_7$–$C_9$Phenylalkyl substituted in the phenyl nucleus by $C_1$–$C_4$alkyl is typically methylbenzyl, dimethylbenzyl, trimethylbenzyl or tert-butylbenzyl.

$C_3$–$C_6$Alkenyl will typically be allyl, 2-methallyl, butenyl, pentenyl and hexenyl. Allyl is preferred.

$R_5$ defined as $C_1$–$C_8$acyl is preferably $C_1$–$C_8$alkanoyl, $C_3$–$C_8$alkenoyl or benzoyl. Illustrative examples are formyl, acetyl, propionyl, butyryl, pentanoyl, hexanoyl, octanoyl, benzoyl, acryloyl and crotonoyl.

Alkylene containing up to 18 carbon atoms is typically ethylene, propylene, trimethylene, tetramethylene, pentamethylene, 2,2-dimethyltrimethylene, hexamethylene, trimethylhexamethylene, octamethylene, decamethylene, undecamethylene and dodecamethylene. $R_2$ and $R_7$ are preferably $C_2$–$C_6$alkylene. $R_2$ and $R_7$ are most preferably hexamethylene.

$C_5$–$C_7$Cycloalkylene is exemplified by cyclohexylene.

C–$C_4$Alkylene-di($C_5$–$C_7$cycloalkylen) is exemplified by methylenedicyclohexylene.

A 5- to 10-membered heterocyclic ring formed by $R_1$, $R_2$ and $R_3$ or $R_6$, $R_7$ and $R_8$, together with the linking nitrogen atoms, will typically be

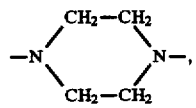

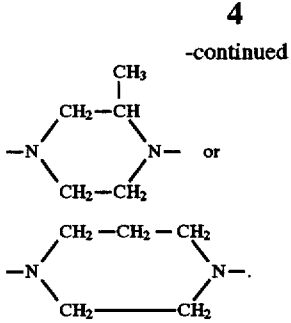

A 6-membered heterocyclic ring is preferred.

A 5- to 10-membered heterocyclic ring formed by $R_9$ and $R_{10}$ together with the linking nitrogen atom, will typically be 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl. The group

is most preferably morpholino.

$R_1$, $R_3$, $R_6$ and $R_8$ are most preferably a group of formula II.

The compounds described as components a) to d) are known per se (some are commercially available) and can be prepared by known methods, as described inter alia in U.S. Pat. No. 4,086,204, U.S. Pat. No. 4,331,586, U.S. Pat. No. 4,477,615, Chemical Abstracts-CAS No. 136 504-96-6 and U.S. Pat. No. 4,340,534.

Component c) can be prepared in analogy to known methods, conveniently by reacting a polyamine of formula IVa with cyanuric chloride in a molar ratio of 1:2 to 1:4, in the presence of anhydrous lithium, sodium or potassium carbonate in an organic solvent such as 1,2-dichlorethane, toluene, xylene, benzene, dioxane or tert-amyl alcohol in the temperature range from −20° C. to +10° C., preferably from −10° C. to +10° C., most preferably from 0° C. to +10° C., for 2 to 8 hours, and subsequently reacting the resultant product with a 2,2,6,6-tetramethyl-4-piperidylamine of formula IVb. The molar ratio of 2,2,6,6-tetramethyl-4-piperidylamine to polyamine of formula IVa is conveniently 4:1 to 8:1. The mount of 2,2,6,6-tetramethyl-4-piperidylamine can be added all at once or in several increments at an interval of several hours.

The ratio of polyamine of formula IVa: cyanuric chloride:2,2,6,6-tetramethyl-4-piperidylamine of formula IVb is preferably 1:3:5 to 1:3:6.

The following Example constitutes one means of preparing preferred component c).

EXAMPLE

With stirring, 23.6 g (0.128 mol) of cyanuric chloride, 7.43 g (0.0426 mol) of N,N'-bis[3-aminopropyl] ethylenediamine and 18 g (0.13 mol) of anhydrous potassium carbonate are reacted in 250 ml of 1,2-dichloroethane at 5° C. for 3 hours. The mixture is warmed for a further 4 hours to room temperature. Then 27.2 g (0.128 mol) of N-(2,2,6,6-tetramethyl-4-piperidyl)butylamine are added and the resultant mixture is heated for 2 hours to 60° C. Another 18 g (0.13 mol) of anhydrous potassium carbonate are added and the mixture is heated for a further 6 hours at 60° C. The solvent is distilled off under a slight vacuum (200 mbar) and replaced by xylene. Then 18.2 g (0.085 mol) of N-(2,2,6,6-tetramethyl-4-piperidyl)butylamine and 5.2 g (0.13 mol) of ground sodium hydroxide are added and the mixture is refluxed for 2 hours and the water of reaction is removed as an azeotrope by distillation over a further 12 hours. The mixture is filtered. The solution is washed with water and dried over $Na_2SO_4$. The solvent is removed by evaporation and the residue is dried at 120°–130° C. under vacuum (0.1 mbar). Component c) is obtained as a colourless resin.

Component c) may typically be in the form of a compound of formula IV-1, IV-2 or IV-3. It can also be obtained as a mixture of these three compounds.

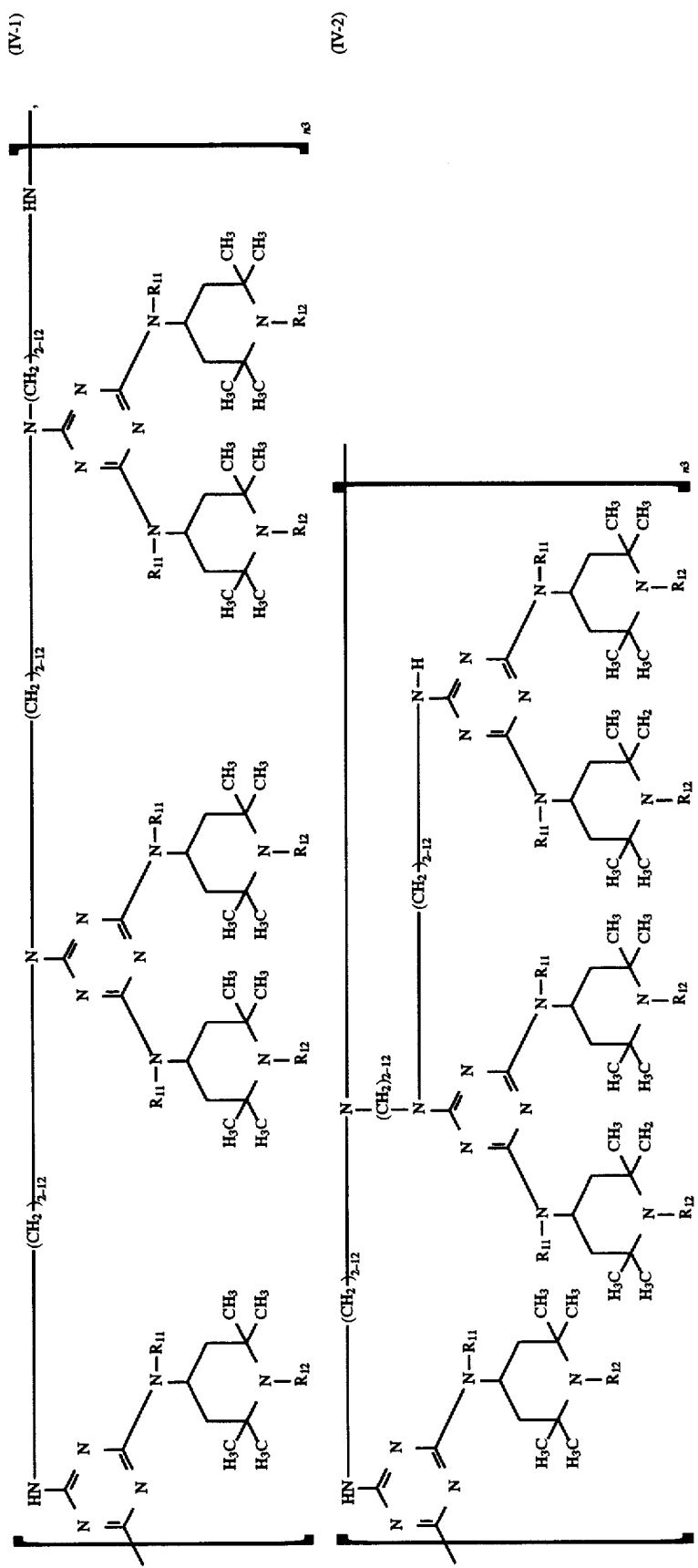

(IV-3)
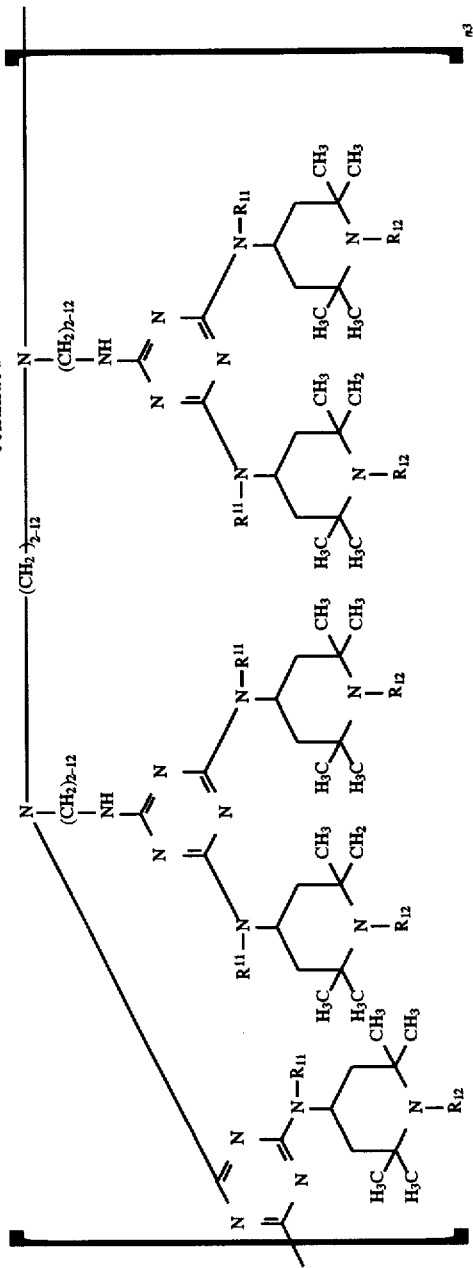
A preferred meaning of formula IV-1 is
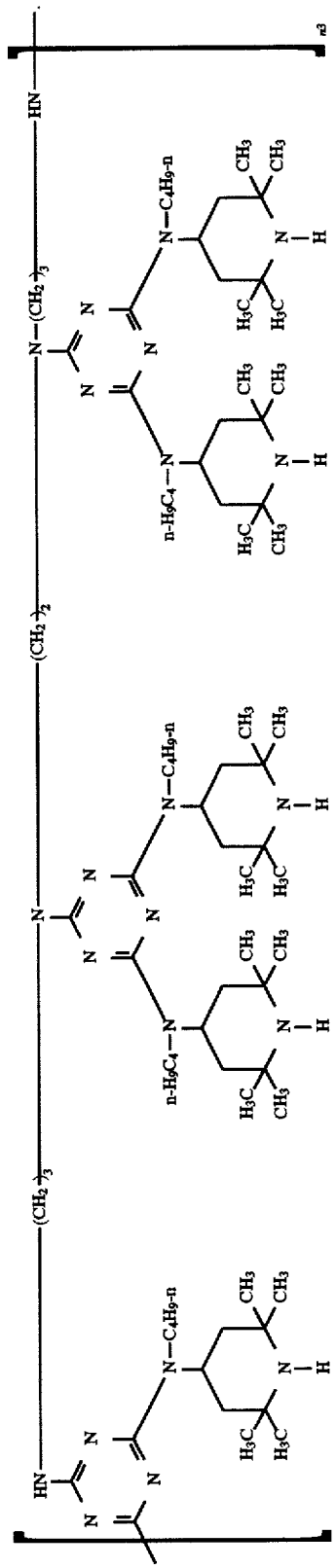
A preferred meaning of formula IV-2 is

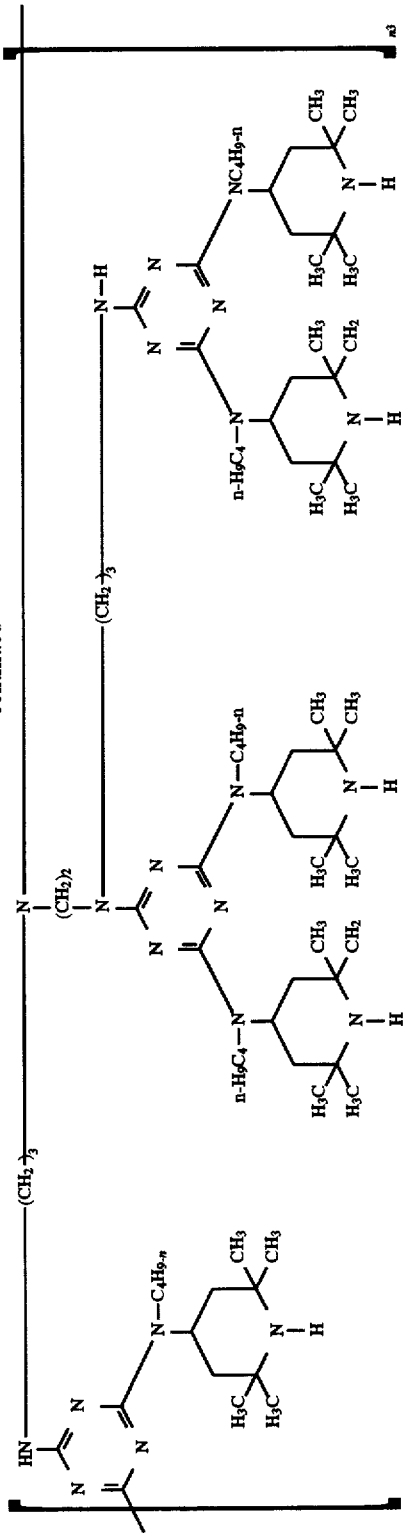
A preferred meaning of formula IV-3 is
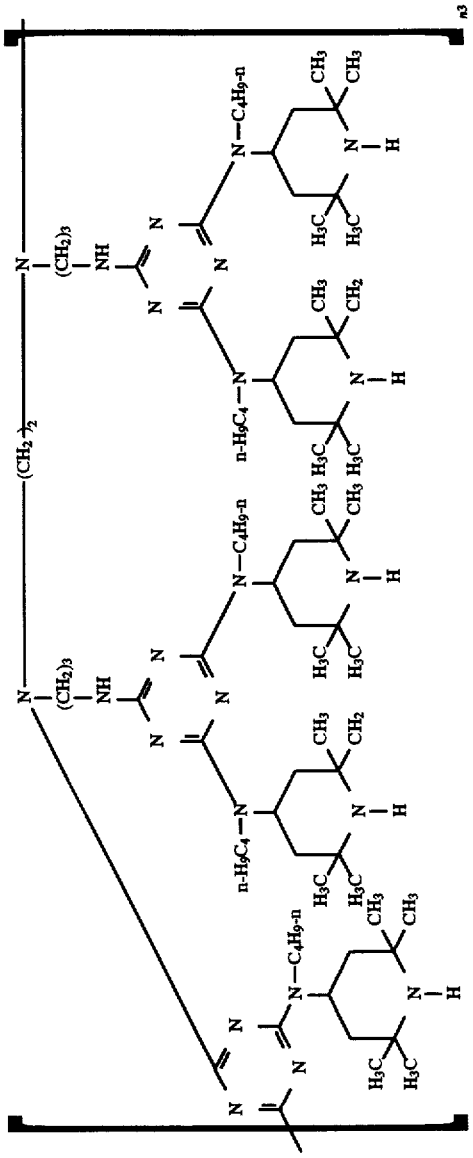

In the above formulae IV-1 to IV-3, $n_3$ is preferably 1 to 20.

It is preferred to use ®CHIMASSORB 944 or ®DASTIB 1082 as component a), ®CYASORB UV 3346 as component b), ®UVASORB HA 88 as component c), and ®HOSTAVIN N 30 as component d).

The compound of formula VI is preferably ®TINUVIN 622 and and can be pepared in analogy to the process described in U.S. Pat. No. 4 233 412.

The compounds of formulae Va and Vb may be obtained as a mixture, in which case the ratio of Va:Vb may be conveniently 20:1 to 1:20 or 1:10 to 10:1.

The meanings of the end groups which saturate the free valences in the compounds of formulae I, III, IVa, IVb, Va and Vb, will depend on the processes used for the preparation of said compounds. The end groups can also in addition be modified after the synthesis of the compounds.

If the preparation of the compounds of formulae I and III is carried out by reacting a compound of formula

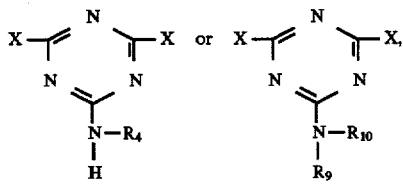

wherein X is typically halogen, preferably chloro, and $R_4$, $R_9$ and $R_{10}$ have the meanings given above, with a compound of formula

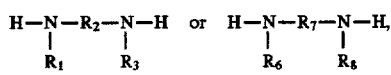

wherein $R_1$, $R_2$, $R_3$, $R_6$, $R_7$ and $R_8$ have the meanings given above, then the end group which is attached to the diamino radical is hydrogen or

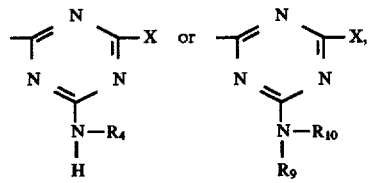

and the end group which is attached to the triazine radical is X or

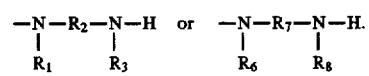

If X is a halogen substituent, then it is conveniently replaced after the reaction by e.g. —OH or an amino group. Suitable amino groups are typically: pyrrolidin-1-yl, morpholino, —NH$_2$, —N(C$_1$-C$_8$alkyl)$_2$ and —NR (C$_1$-C$_8$alkyl), wherein R is hydrogen or a group of formula II.

In the compounds of formula IV, the end group which is attached to the triazine radical is typically Cl or a group

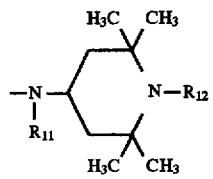

and the end group which is attached to the amino group is typically hydrogen or a group

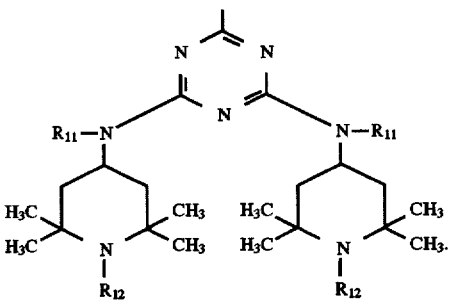

In the compounds of formula Va, the end group which is attached to the nitrogen is typically hydrogen, and the end group which is attached to the 2-hydroxypropylene radical is typically a group

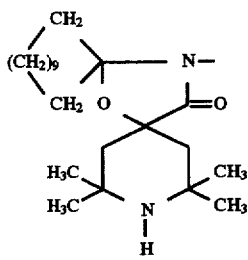

In the compounds of formula Vb, the end group which is attached to the dimethylene radical is typically —OH and the end group which is attached to the oxygen may be hydrogen. The end groups may also be polyether radicals.

If the compounds of formula VI are prepared by reacting a compound of formula

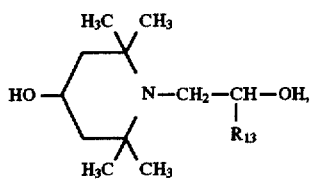

wherein $R_{13}$ is hydrogen or methyl, with a dicarboxylate of formula Y—OOC—$R_{14}$—COO—Y, wherein Y may be methyl, ethyl or propyl, and $R_{14}$ has the meaning given above, then the end group which is attached to the 2,2,6,6-tetramethyl-4-oxypiperidin-1-yl radical is hydrogen or —CO—$R_{14}$—COO—Y, and the end group which is attached to the diacyl radical is —O—Y or

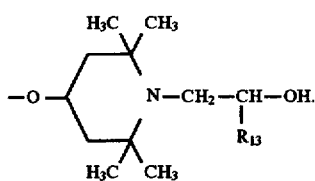

The following stabiliser systems are particularly preferred embodiments of the invention:
1) stabiliser system comprising ®CHIMASSORB 944 and ®CYASORB UV 3346,
2) stabiliser system comprising ®CHIMASSORB 944 and ®UVASORB HA 88,
3) stabiliser system comprising ®DASTIB 1082 and ®CYASORB UV 3346,
4) stabiliser system comprising ®DASTIB 1082 and ®UVASORB HA 88,
5) stabiliser system comprising ®CHIMASSORB 944 and ®HOSTAVIN N 30,
6) stabiliser system comprising ®DASTIB 1082 and ®HOSTAVIN N 30,
7) stabiliser system comprising ®CYASORB UV 3346 and ®HOSTAVIN N 30,
8) stabiliser system comprising ®UVASORB HA 88 and ®HOSTAVIN N 30,
9) stabiliser system comprising ®CYASORB UV 3346 and ®UVASORB HA 88 and
10) stabiliser system comprising ®CHIMASSORB 944 and ®DASTIB 1082.

A preferred embodiment of the invention is a stabiliser system
 comprising at least one compound of component a) and at least one compound of component b) or c), or
 comprising at least one compound of component a), b) or c) and at least one compound of component d), or
 comprising at least one compound of component b) and at least one compound of component c), or
 comprising at least two compounds of component a).

Also preferred is a stabiliser mixture, wherein $R_5$ is hydrogen, $C_1$–$C_4$alkyl, allyl, benzyl or acetyl, preferably hydrogen or methyl.

A further preferred stabiliser mixture is that wherein
$R_1$, $R_3$ and $R_4$ are each independently of one another $C_1$–$C_{10}$alkyl, $C_5$–$C_7$cycloalkyl,
$C_1$–$C_4$alkyl-substituted $C_5$–$C_7$cycloalkyl, phenyl, phenyl substituted by OH and/or
$C_1$–$C_4$alkyl, $C_7$–$C_9$phenylalkyl, $C_7$–$C_9$phenylalkyl substituted in the phenyl nucleus by —OH and/or $C_1$–$C_4$alkyl; or a group of formula II, and
$R_1$ and $R_3$ are additionally each independently of the other hydrogen,
$R_2$ is $C_2$–$C_{10}$alkylene, $C_5$–$C_7$cycloalkylene or $C_1$–$C_4$alkylene-di($C_5$–$C_7$cycloalkylene), or
$R_1$, $R_2$ and $R_3$, together with the linking nitrogen atoms, form a 5- to 7-membered heterocyclic ring, and
$n_1$ is an integer from 2 to 40;
$R_6$ and $R_8$ are each independently of the other hydrogen, $C_1$–$C_{10}$alkyl, $C_5$–$C_7$cycloalkyl,
$C_1$–$C_4$alkyl-substituted $C_5$–$C_7$cycloalkyl, phenyl, phenyl substituted by OH and/or
$C_1$–$C_4$alkyl, $C_7$–$C_9$phenylalkyl, $C_7$–$C_9$phenylalkyl substituted in the phenyl nucleus by —OH and/or $C_1$–$C_4$alkyl; or a group of formula II,
$R_7$ is $C_2$–$C_{10}$alkylene, $C_5$–$C_7$cycloalkylene or $C_1$–$C_4$alkylene-di($C_5$–$C_7$cycloalkylene), or
$R_6$, $R_7$ and $R_8$, together with the linking nitrogen atoms, form a 5- to 7-membered heterocyclic ring,
$R_9$ and $R_{10}$ are each independently of the other $C_1$–$C_{10}$alkyl, $C_5$–$C_7$cycloalkyl, $C_1$–$C_4$alkyl-substituted $C_5$–$C_7$cycloalkyl, phenyl, phenyl substituted by OH and/or
$C_1$–$C_4$alkyl, $C_7$–$C_9$phenylalkyl, $C_7$–$C_9$phenylalkyl substituted in the phenyl nucleus by —OH and/or $C_1$–$C_4$alkyl; or a group of formula II, or
$R_9$ and $R_{10}$, together with the linking nitrogen atom, form a 5- to 7-membered heterocyclic ring, and
$n_2$ is an integer from 2 to 40;
$n_4$ and $n_4*$ are each independently of the other an integer from 2 to 40.

Also preferred is a stabiliser mixture wherein
$R_1$ and $R_3$ are each independently of the other hydrogen, $C_1$–$C_8$alkyl, $C_5$–$C_7$cycloalkyl, phenyl, benzyl or a group of formula II,
$R_2$ is $C_2$–$C_8$alkylene, cyclohexylene or methylene-di(cyclohexylene),
$R_4$ is $C_1$–$C_{10}$alkyl, $C_5$–$C_7$cycloalkyl or $C_1$–$C_4$alkyl-substituted $C_5$–$C_7$cycloalkyl, and
$n_1$ is an integer from 2 to 25;
$R_6$ and $R_8$ are each independently of the other hydrogen, $C_1$–$C_8$alkyl, $C_5$–$C_7$cycloalkyl, phenyl, benzyl or a group of formula II,
$R_7$ is $C_2$–$C_8$alkylene, cyclohexylene or methylene-di(cyclohexylene),
$R_9$ and $R_{10}$ are each independently of the other $C_1$–$C_8$alkyl, $C_5$–$C_7$cycloalkyl, phenyl, benzyl or a group of formula II, or
$R_9$ and $R_{10}$, together with the linking nitrogen atom, are 1-pyrrolidyl, piperidino, morpholino, 1-piperazinyl, 4-methyl-1-piperazinyl, 1-hexahydroazepinyl, 5,5,7-trimethyl-1-homopiperazinyl or 4,5,5,7-tetramethyl-1-homopiperazinyl, and
$n_2$ is an integer from 2 to 25; and
$n_4$ and $n_4*$ are each independently of the other an integer from 2 to 25.

A stabiliser mixture comprising at least one compound of component a) and at least one compound of component b) is particularly preferred.

A stabiliser mixture comprising a compound of formula I and a compound of formula III is also preferred.

A further preferred embodiment of the invention is a stabiliser mixture comprising at least one compound of component a), b) or c) and at least one compound of component d).

The variables $n_1$, $n_2$, $n_4$ and $n_4*$, which are identical or different, are preferably an integer from 2 to 40, more particularly from 2 to 25, typically from 2 to 20 or 2 to 10. $n_3'$, $n_3''$ and $n_3'''$ are each independently of one another preferably 2 to 4.

A further preferred embodiment of the invention is a stabiliser mixture wherein $R_1$ and $R_3$ are each independently of the other hydrogen, $C_1$–$C_4$alkyl or a group of formula II, wherein
$R_5$ is hydrogen or methyl,
$R_2$ is $C_2$–$C_6$alkylene,
$R_4$ is $C_1$–$C_{10}$alkyl or cyclohexyl, and $n_1$ is an integer from 2 to 20;
$R_6$ and $R_8$ are each independently of the other hydrogen, $C_1$–$C_4$alkyl or a group of formula II, wherein $R_5$ is hydrogen or methyl, $R_7$ is $C_2$–$C_6$alkylene, $R_9$ and $R_{10}$ are each independently of the other $C_1$–$C_8$alkyl or a group formula II, wherein $R_5$ has the meaning given above, or $R_9$ and $R_{10}$, together with the linking nitrogen atom, are morpholino, and $n_2$ is an integer from 2 to 20; and $n_4$ and $n_4^*$ are each independently of the other an integer from 2 to 20.

A particularly preferred embodiment of the invention is a stabiliser mixture wherein the compound of formula I is

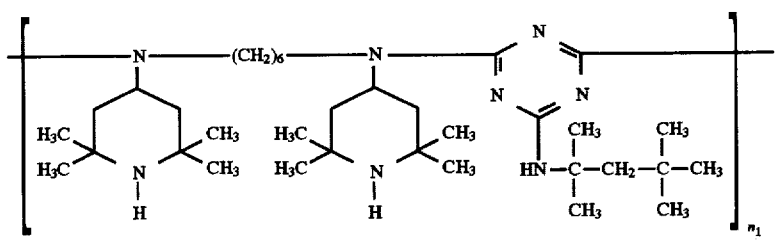

or

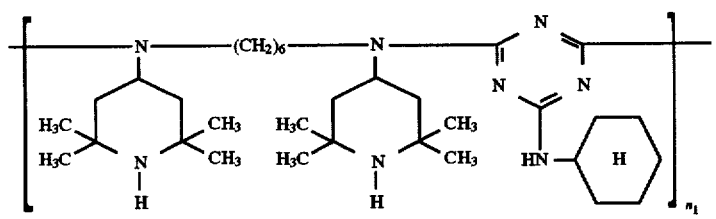

and the compound of formula III is

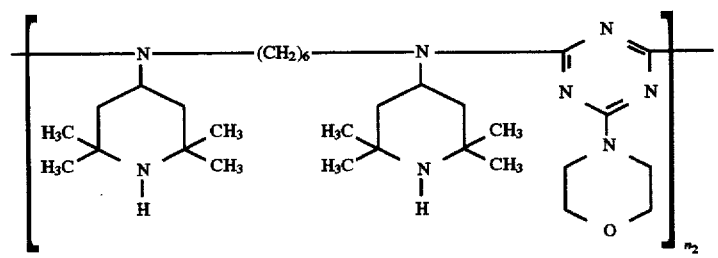

and $n_1$, $n_2$, $n_4$ and $n_4^*$ are each independently of one another an integer from 2 to 20.

A further particularly preferred embodiment of the invention is a stabiliser mixture comprising the compounds

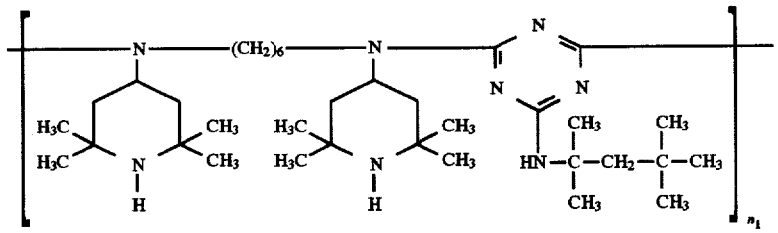

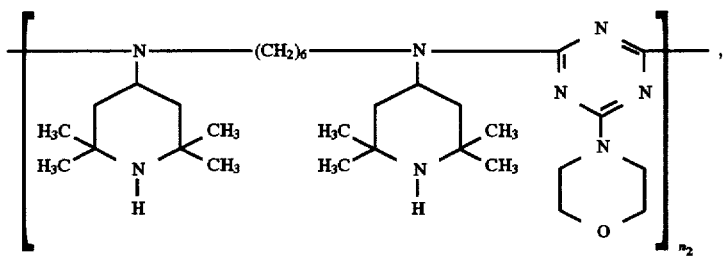

wherein $n_1$ and $n_2$ are each independently of the other an integer from 2 to 20.

In a preferred embodiment of component c), $n_3'$, $n_3''$ and $n_3'''$ are each independently of one another an integer from 2 to 4, $R_{11}$ is $C_1$–$C_4$alkyl and $R_{12}$ is hydrogen.

Component c) is most preferably a product obtainable by reacting a product, obtained by reacting a polyamine of formula

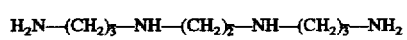

with cyanuric chloride, with a compound of formula

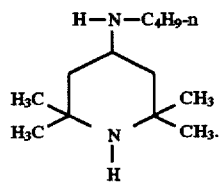

Other particularly preferred embodiments of the invention are:

(1) a stabiliser mixture comprising the compound a product obtainable by reacting a product, obtained by reacting a polyamine of formula

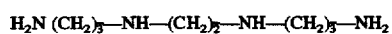

with cyanuric chloride, with a compound of formula

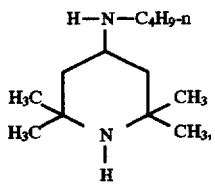

(2) a stabiliser mixture comprising a mixture of compounds Va and Vb, wherein $n_4$ and $n_4{}^*$ are each independently of the other an integer from 2 to 20, and the compound

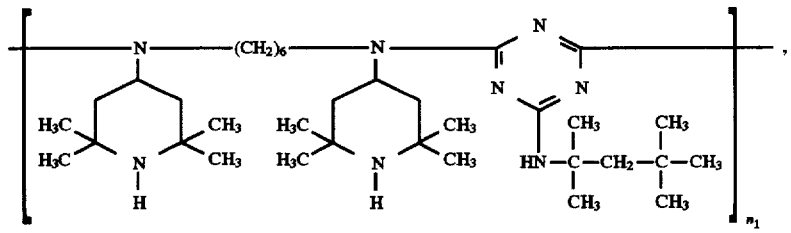

wherein $n_1$ is an integer from 2 to 20, and

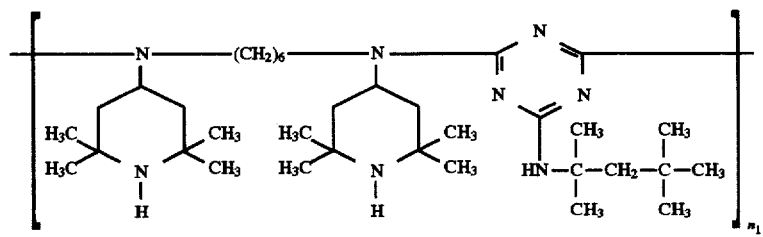

or

-continued

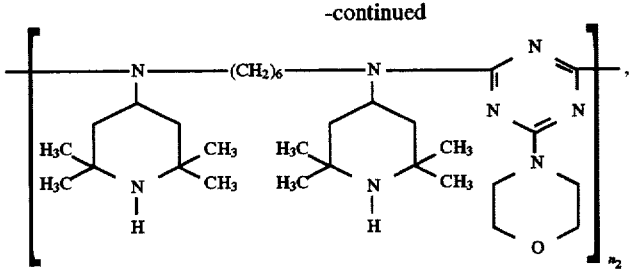

wherein $n_1$ and $n_2$ are each independently of the other an integer from 2 to 20, (3) a stabiliser mixture comprising a mixture of compounds Va and Vb, wherein $n_4$ and $n_4{}^*$ are each independently of the other an integer from 2 to 20, and a product obtainable by reacting a product, obtained by reaction of a polyamine of formula

with cyanuric chloride, with a compound of formula

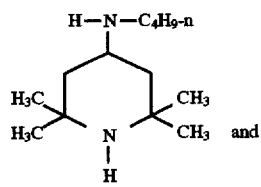

(4) a stabiliser mixture comprising the compound

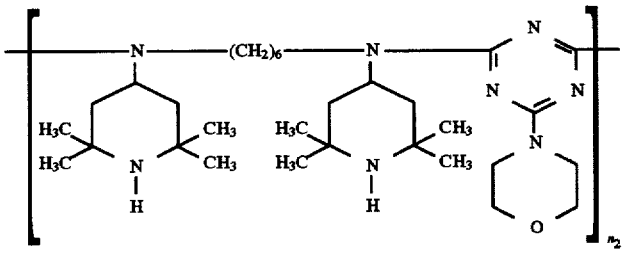

wherein $n_2$ is an integer from 2 to 20, and a product obtainable by reacting a product, obtained by reaction of a polyamine of formula

with cyanuric chloride, with a compound of formula

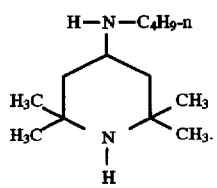

The stabiliser mixture of this invention is suitable for stabilising organic materials against thermal, oxidative or light-induced degradation. Illustrative examples of such materials are:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (uncrosslinked or crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/-isoprene copolymers, ethylene/alkyl acrylate copolymers, ethylene/alkyl methacrylate copolymers, ethylene/vinyl acetate copolymers and their copolymers with carbon monoxide or ethylene/ acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPF/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, for example styrene/butadiene, styrene/acrylonitrile, styrene/alkyl methacrylate, styrene/butadiene/alkyl acrylate, styrene/butadiene/ alkyl methacrylate, styrene/maleic anhydride, styrene/ acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/ styrene, styrene/isoprene/styrene, styrene/ethylene/ butylene/styrene or styrene/ethylene/propylene/ styrene.

7. Graft copolymers of styrene or $\alpha$-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/ propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from $\alpha,\beta$-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/ alkoxyalkyl acrylate or acrylonitrile/vinyl halide copolymers or acrylonitrile/alkyl methacrylate/ butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with diglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene aliamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyether imides, polyester imides, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.
20. Polysulfones, polyether sulfones and polyether ketones.
21. Crosslinked polymers derived from aldehydes on the one hand and phenols, ureas and melamines on the other hand, such as phenol/formaldehyde resins, urea/formaldehyde resins and melamine/formaldehyde resins.
22. Drying and non-drying alkyd resins.
23. Unsaturated polyester resins derived from copolyesters of saturated and unsaturated dicarboxylic acids with polyhydric alcohols and vinyl compounds as crosslinking agents, and also halogen-containing modifications thereof of low flammability.
24. Crosslinkable acrylic resins derived from substituted acrylates, for example epoxy acrylates, urethane acrylates or polyester acrylates.
25. Alkyd resins, polyester resins and acrylate resins crosslinked with melamine resins, urea resins, isocyanates, isocyanurates, polyisocyanates or epoxy resins.
26. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.
27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.
28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.
29. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.
30. Aqueous emulsions of natural or synthetic rubber, e.g. natural latex or latices of carboxylated styrene/butadiene copolymers.

The invention thus also relates to a composition comprising an organic material susceptible to oxidative, thermal or light-induced degradation and a stabiliser mixture according to the invention.

The organic material is preferably a synthetic polymer, more particularly one selected from the aforementioned groups. Polyolefins are preferred and polyethylene, polypropylene and copolymers thereof are particularly preferred.

The compounds of the stabiliser system according to the invention may be incorporated singly or in admixture with each other in the material to be stabilised. The compounds may conveniently be used independently of each other in amounts of 0.01 to 4.99%, with the proviso that the total amount of the stabiliser mixture is preferably 0.02 to 5%, based on the total weight of the material to be stabilised.

The total amount of the stabiliser system is preferably 0.05 to 3%, more particularly 0.05 to 2% or 0.05 to 1%, based on the total weight of the material to be stabilised.

The weight ratio of the two compounds of the stabiliser system according to the invention is preferably 20:1 to 1:20, more particularly 10:1 to 1:10, typically 1:5 to 5:1.

The stabiliser mixture or the individual stabilisers are incorporated in the organic material by known methods, conveniently before or during shaping to moulder articles or alternatively by coating the organic material with a solution or dispersion of the compounds and subsequently removing any solvent used by evaporation. The individual compounds of the stabiliser mixture can be incorporated in the material to be stabilised as powder, granulate or also in the form of a masterbatch which contains these compounds in a concentration of 2.5 to 25% by weight.

If desired, the compounds of the novel stabiliser mixture can be melt blended with each other before incorporation in the organic material.

The stabiliser mixture according to the invention or the individual stabilisers may also be added during polymerization or crosslinking.

The stabilised materials may be in any form of presentation, typically sheets, filaments, ribbons, mouldings, profiles or binders for coating compositions, adhesives or putties.

Further different customary additives may also be incorporated in the stabilised organic materials, typically including:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl) dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tertbutyl-4-hydroxy-2-methylphenyl)-4-n-dodecylmercaptobutane, 1,1,5,5-tetra(5-tert-butyl-4-hydroxy-2-methylphenyl) pentane.

1.7. O-, N- and S-benzyl compounds, for example 3,5,3',5'-tetra(tert-butyl-4,4'-dihydroxydibenzyl)ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl) malonate, dioctadecyl-2-(3-tert-butyl-4-hydroxy-5-methylbenzyl)malonate, didodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazines, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris-(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl) hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert butyl-4-hydroxyphenyl) propionic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris (hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl)propionic acid with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.15. Esters of β-(3,5-dicylohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.21]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl) propionic acid, e.g. N,N'-bis(3,5-di-tert-butyl-4-hydroxyphenylpropionyl)hexamethylenediamine, N,N'-bis (3,5-di-tert-butyl-4-hydroxyphenylpropionyl) trimethylenediamine, N,N'-bis(3,5-di-tert-butyl-4-hydroxyphenylpropionyl)hydrazine.

2. UV absorbers and light stabilisers 2.1 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl) benzotriazole, 2-(2'-hydroxy-4'-octyloxyphenyl) benzotriazole, 2-(3',5'-di-tert-amyl-2'-hydroxyphenyl) benzotriazole, 2-(3',5'-bis-(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2- ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO(CH$_2$)$_3$—]$_2$—, where R=3'-tert-butyl-4'-hydroxy-5'-2H-benzotriazol-2-ylphenyl.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tertbutylphenyl 3,5-di-tert-butyl-4-hydroxybenzoate, hexadecyl 3,5-di-tert-butyl-4-hydroxybenzoate, octadecyl 3,5-di-tertbutyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-di-phenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl) sebacate, bis(1-octyloxy-2,2,6,6-tetramethyl-4-piperidyl) sebacate, bis(1,2,2,6,6-pentamethyl-4-piperidyl)n-butyl-3,5-di-tert-butyl-4-hydroxybenzylmalonate, the condensate of 1-(2-hydroxyethyl)-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro-1,3,5-triazine, tris(2,2,6,6-tetramethyl-4-piperidyl) nitrilotriacetate, tetrakis(2,2,6,6-tetramethyl-4-piperidyl)-1,2,3,4-butanetetracarboxylate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetramethylpiperidyl) succinate, the condensate of N,N'-bis(2,2,6,6-tetramethyl-4-piperidyl)hexamethylenediamine and 4-morpholino-2,6-dichloro-1,3,5-triazine, the condensate of 2-chloro-4,6-bis (4-n-butylamino-2,2,6,6-tetramethylpiperidyl)-1,3,5-triazine and 1,2-bis(3-aminopropylamino)ethane, the condensate of 2-chloro-4,6-bis(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensation product of N,N'-bis-(2,2,6,6-tetramethyl-4-piperidyl) hexamethylenediamine and 4-cyclohexylamino-2,6-dichloro-1,3,5-triazine, a condensation product of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5] decane, a reaction product of 7,7,9,9-tetramethyl-2-cycloundecyl-1-oxa-3,8-diaza-4-oxospiro[4,5]decane und epichlorohydrin.

2.7. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and the mixture thereof with 2-ethoxy-2'-ethyl-5,4'-di-tert-butoxanilide and mixtures of ortho- and para-methoxy-disubstituted oxanilides and mixtures of o- and p-ethoxy-disubstituted oxanilides.

2.8. 2-Hydroxphenyl-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis (2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy) phenyl]-4,6-bis(2,4-dimethyl)-1,3,5-triazine, 2-[2-hydroxy-4-(2-hydroxy-3-octyloxy-propyloxy)phenyl]-4,6-bis(2,4-dimethyl)-1,3,5-triazine, 2-[4-(dodecyloxy/tridecyloxy-2-hydroxypropoxy)-2-hydroxy-phenyl]-4,6-bis(2,4-dimethylphenyl)-1,3,5-triazine, 2-[2-hydroxy-4-(2-hydroxy-3dodecyloxy-propoxy)phenyl]-4,6-bis(2,4-dimethylphenyl)-1,3,5-triazine, 2-(2-hydroxy-4-hexyloxy) phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxy-propoxy)phenyl]-1,3,5-triazine, 2-(2-hydroxyphenyl)-4-(4-methoxyphenyl)-6-phenyl-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazine, N,N'-diacetyladipoyl dihydrazide, N,N'-bis(salicyloyl) oxalyl dihydrazide, N,N'-bis(salicyloyl)thiopropionyl dihydrazide.

4. Phosphites and phosphonites, for example triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl) pentaerythritol diphosphite, bis(2,6-di-tert-butyl-4-methylphenyl)-pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)-pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenzo-[d,g]-1,3,2-dioxaphosphocine, 6-fluoro-2,4,8, 10-tetra-tert-butyl-12-methyl-dibenzo-[d,g]-1,3,2-dioxaphosphocine, bis(2,4-di-tert-butyl-6-methylphenyl)methylphosphite, bis(2,4-di-tert-butyl-6-methylphenyl)ethylphosphite.

5. Peroxide scavengers, for example esters of β-thiodipropionic acid such as the lauryl, stearyl, myristyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecylmercapto)propionate.

6. Polyamide stabilisers, for example copper salts in combination with iodides and/or phosphorus compounds and salts of divalent manganese.

7. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, e.g. calcium stearate, zinc stearate, magnesium behenate, magnesium stearate, sodium ricinolate and potassium palmitate, antimony pyrocatecholate or tin pyrocatecholate.

8. Nucleating agents, for example 4-tert-butylbenzoic acid, adipic acid, diphenylacetic acid.

9. Fillers and reinforcing, for example, calcium carbonate, silicates, glass fibres, glass beads, asbestos, talc, kaolin, mica, barium sulfate, metal oxides and hydroxides, carbon black, graphite.

10. Other additives, for example plasticisers, lubricants, emulsifiers, pigments, fluorescent whiening agents, flame retardants, antistatic agents, blowing agents.

11. Benzofuranones and indolinones, as disclosed, inter alia, in U.S. Pat. No. 4,325,863, U.S. Pat. No. 4,338,244, U.S. Pat. No. 5,175,312, U.S. Pat. No. 5,216,052, U.S. Pat. No. 5,252,643, DE-A-4 316 611, DE-A-4 316 622, DE-A-4 316 876, EP-A-0 589 839 or EP-A-0 591 102, or 3-[4-(2-acetoxyethoxy)phenyl]-5,7-di-tert-butylbenzofuran-2-one, 5,7-di-tert-butyl-3-[4-(2-stearoyloxyethoxy)phenyl]-benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxyphenyl)-5,7-di-tert-butylbenzofuran-2-one.

The weight ratio of the stabiliser mixture to the customary additives may be 1:0.5 to 1:5.

A further object of the invention is the use of the novel stabiliser mixture for stabilising organic material against oxidative, thermal or light-induced degradation.

The organic materials stabilised with the stabiliser system are distinguished not only by substantially enhanced light-fastness but also by extremely enhanced heat-resistance.

The invention is illustrated in more detail by the following Examples. All percentages are by weight, unless otherwise indicated.

Stabilisers used in the following Examples 1–4:

Compound A-1:

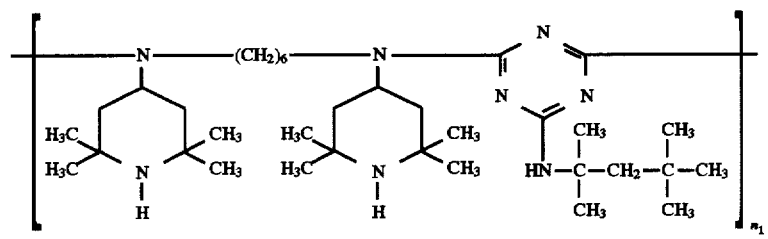

The mean value of $n_1$ is 4.5.

Compound A-2:

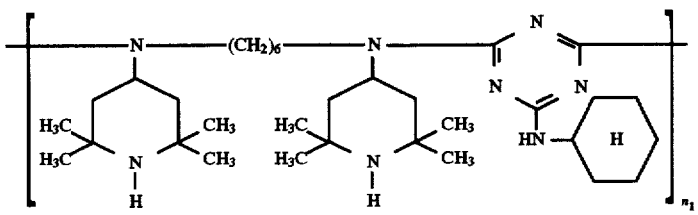

The mean value of $n_1$ is 5.1.

Compound B:

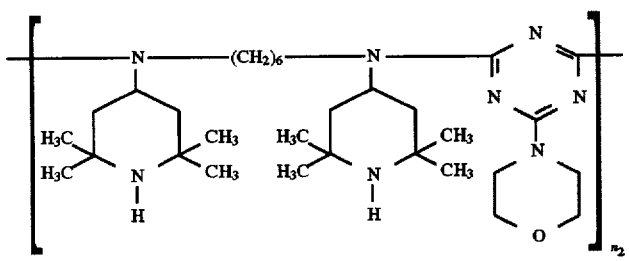

The mean value of $n_2$ is 3.5.

Compound C:

Product obtainable by reacting a product, obtained by reaction of a polyamine of formula

with cyanuric chloride, with a compound of formula

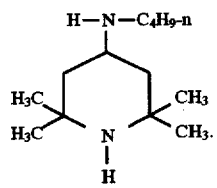

Compound D:

A mixture of compounds Va and Vb,

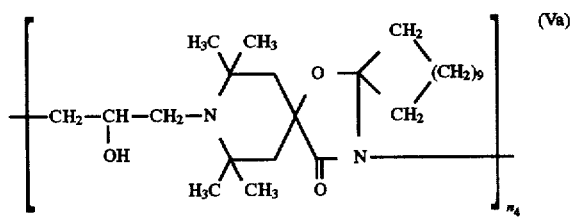

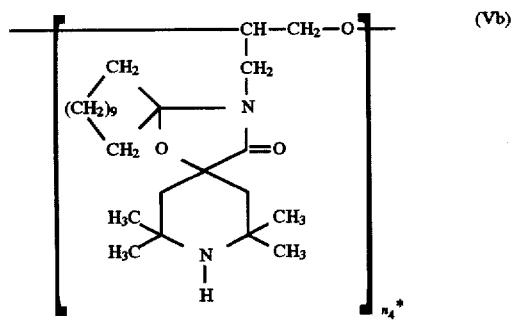

wherein the mean value of $n_4$ is about 3.9 and of $n_4^*$ is about 4.2, and the ratio of (Va) to (Vb) is about 4:1.

EXAMPLE 1

Light stabilisation of polypropylene fibres 1000 parts of unstabilised polypropylene powder (melt index: c. 15 g/10 min; measured at 230° C. and 2.16 kg) are mixed in an impeller with 0.5 parts of calcium 3,5-di-tert-butyl-4-hydroxybenzylmonoethylphosphonate, 0.5 part of tris(2,4-di-tert-butylphenyl)phosphite, 2.5 parts of titanium dioxide, 1 part of calcium stearate and 6 parts of the stabilisers listed in Table 1 and then extruded in an extruder at 220° C. and granulated. The granulate so obtained is spun in a laboratory melt spinning line at a maximum temperature of 270° C. and a speed of 600 m/min to a 12.1 Dezitex multifilament. This multifilament is stretched on a draw-twister and twisted. The draw ratio is 1:3.2, such that finally multifilaments of 3.9 Dezitex are obained. These multi filaments are mounted on white cardboard and treated for 20 minutes in an oven at 120° C. (simulation of tentering) and finally exposed in the Xenotest 1200.

Indicator of the stabilising action is the exposure time to 50% loss of tensile strength. The results are summarised in Table 1.

TABLE 1

| Light stabilisation of polypropylene multifilament (3.9 Dezitex) | |
|---|---|
| Stabiliser | Exposure in Xenotest 1200 to 50% loss of tensile strength |
| none | 270 |
| 0.6% of compound A-1 | 4050 |
| 0.6% of compound B | 3600 |
| 0.3% of compound A-1 and 0.3% of compound B | 4350 |

EXAMPLE 2

Light stabilisation of polypropylene fibres 1000 parts of unstabilised polypropylene powder (melt index: c. 15 g/10 min; measured at 230° C. and 2.16 kg) are mixed in an impeller with 0.5 part of calcium 3,5-di-tert-butyl-4-hydroxybenzylmonoethylphosphonate, 0.5 part of tris(2,4-di-tert-butylphenyl)phosphite, 2.5 parts of titanium dioxide, 1 part of calcium stearate and the stabilisers listed in Table 2 and then extruded in an extruder at 220° C. and granulated. The granulate so obtained is spun in a laboratory melt spinning unit at a maximum temperature of 270° C. and a speed of 600 m/min to a 12.1 Dezitex multifilament. This multifilament is stretched on a draw-twister and twisted. The draw ratio is 1:3.2, such that finally multifilaments of 3.9 Dezitex are obained. These multifilaments are mounted on white cardboard and then exposed in a Ci 65 WEATHER-OMETER.

Indicator of the stabilising action is the exposure time to 50% loss of tensile strength. The results are summarised in Table 2.

TABLE 2

Light stabilisation of polypropylene multifilament (3.9 Dezitex)

| Stabiliser | Hours of exposure in Ci 65 Weather-Ometer to 50% loss of tensile strength |
|---|---|
| none | 300 |
| 0.3% of compound A-1 | 3500 |
| 0.3% of compound D | 3175 |
| 0.15% of compound A-1 and 0.15% of compound D | 3950 |

EXAMPLE 3

Light stabilisation of polypropylene block copolymer sheets 100 parts of polypropylene block copolymer powder, 0.05 part of pentaerythrityl-tetrakis[3-(3,5-di-tert-butyl-4-hydroxyphenyl)propionate, 0.10 part of tris(2,4-di-tert-butylphenyl)phosphite, 0.1 part of calcium stearate and the stabilisers listed in Table 3 are homogenised in a Brabender plastographen at 200° C. for 10 minutes. The stock is removed from the kneader as rapidly as possible and moulded in a toggle press to a 2–3 mm thick board. A portion of the blank moulding is cut out and pressed between two high-polished rigid aluminium sheets with a hydraulic laboratory press for 6 minutes at 260° C. to a 0.5 mm sheet, which is immediately cooled in a water-cooled press. Segments measuring 60 mm×25 mm are punched out from this 0.5 mm sheet and exposed in a Ci 65 WEATHER-OMETER (black standard temperature 63°±2° C., no wetting). At regular intervals these samples are removed from the exposure apparatus and examined in a IR-spectrophotometer for their carbonyl content. The increase of carbonyl extinction during exposure is an indicator of the photooxidative degradation of the polymer and is usually associated with a decrease in the mechanical properties. The results are reported in Table 3.

TABLE 3

Light stabilisation of polypropylene block copolymer sheets

| Stabiliser | Carbonyl extinction after exposure for 1314 hours |
|---|---|
| none | 0.100 (after 90 hours) |
| 0.20% of compound A-1 | 0.059 |
| 0.20% of compound A-2 | 0.100 (after 1260 hours) |
| 0.20% of compound D | 0.054 |
| 0.10% of compound D and 0.10% of compound A-1 | 0.023 |
| 0.10% of compound D and 0.10% of compound C | 0.025 |
| 0.10% of compound D and 0.10% of compound B | 0.026 |
| 0.10% of compound D and 0.10% of compound A-2 | 0.020 |
| 0.10% of compound A-1 and 0.10% of compound A-2 | 0.051 |

EXAMPLE 4

Light stabilisation of low density polyethylene (PE-LD) sheets 100 parts of PE-LD powder (density=0.918 g/cm$^3$), 0.03 part of octadecyl-3-(3,5-di-tert-butyl-4-hydroxyphenyl)-propionate and the stablisers listed in Table 4 are homogenised in a Brabender plastograph at 180° C. for 10 minutes. The stock is removed from the kneader as rapidly as possible and moulded in a toggle press to a 2–3 mm thick board. A portion of the blank moulding is cut out and pressed between two high-polished rigid aluminium sheets with a hydraulic laboratory press for 6 minutes at 170° C. to a 0.2 mm sheet, which is immediately cooled in a water-cooled press. Segments measuring 60 mm×25 mm are punched out from this 0.2 mm sheet and immersed for 24 hours in a 0.1 N $H_2SO_3$ solution (simulation of acid rain).

The samples are then exposed in a Ci 65 WEATHER-OMETER (black standard temperature 63°±2° C., no wetting). At regular intervals these samples are removed from the exposure apparatus and examined in a IR-spectrophotometer for their carbonyl content. The increase of carbonyl extinction during exposure is an indicator of the photo-oxidative degradation of the polymer and is usually associated with a decrease in the mechanical properties. The results are reported in Table 4.

TABLE 4

Light stabilisation of low density polyethylene sheets (PE-LD)

| Stabiliser | Carbonyl extinction after exposure for 1981 hours |
|---|---|
| none | 0.100 (after 260 hours) |
| 0.15% of compound A-1 | 0.045 |
| 0.15% of compound B | 0.027 |
| 0.15% of compound C | 0.020 |
| 0.15% of compound D | 0.016 |
| 0.075% of compound A-1 and 0.075% of compound B | 0.010 |
| 0.075% of compound A-1 and 0.075% of compound C | 0.031 |
| 0.075% of compound B and 0.075% of compound C | 0.012 |
| 0.075% of compound C and 0.075% of compound A-2 | 0.021 |
| 0.075% of compound D and 0.075% of compound B | 0.009 |
| 0.075% of compound D and 0.075% of compound C | 0.005 |

What is claimed is:

1. A stabilizer mixture comprising at least two different compounds selected from the group of components a), b), c) and d), wherein component a) is at least one compound of formula I

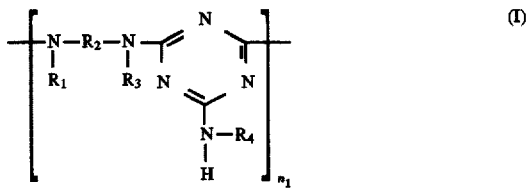

wherein $R_1$ and $R_3$ are each independently of the other hydrogen, $C_1$–$C_4$ alkyl or a group of formula II,

wherein $R_5$ is hydrogen or methyl,
$R_2$ is $C_2$–$C_6$ alkylene,
$R_4$ is $C_1$–$C_{10}$ alkyl or cyclohexyl, and
$n_1$ is an integer from 2 to 20 and at least one of $R_1$, $R_3$, and $R_4$ is a group of formula II;

component b) is at least one compound of formula III

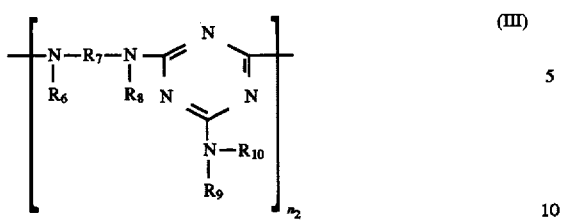

wherein $R_6$ and $R_8$ are each independently of the other hydrogen, $C_1$–$C_4$ alkyl or a group of formula II, wherein $R_5$ is hydrogen or methyl, $R_7$ is $C_2$–$C_6$ alkylene, $R_9$ and $R_{10}$ are each independently of the other $C_1$–$C_8$ alkyl or a group formula II, wherein $R_5$ has the meaning given above, or $R_9$ and $R_{10}$, together with the linking nitrogen atom, are morpholino, and $n_2$ is an integer from 2 to 20 and at least one of $R_6$, $R_8$, $R_9$, and $R_{10}$ is a group of formula (II);

component c) is a product obtainable by reacting a product, obtained by reaction of a polyamine of formula IVa with cyanuric chloride, with a compound of formula IVb

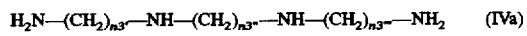

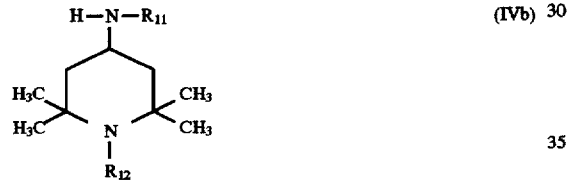

wherein n3', n3" and n3'" are each independently of one another an integer from 2 to 4, $R_{11}$ is $C_1$–$C_4$ alkyl, and $R_{12}$ is hydrogen;

component d) is at least one compound of formulae Va and Vb

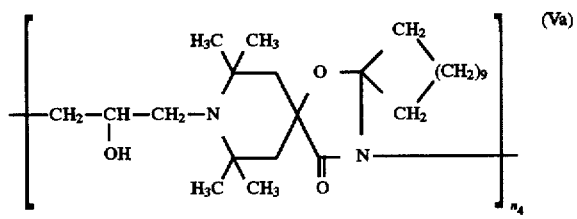

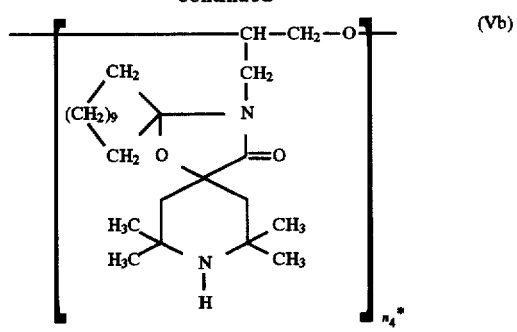

wherein $n_4$ and $n_4$* are each independently of the other an integer from 2 to 20, with the proviso that the stabilizer mixture comprising at least one compound of formula I, at least one compound of formula III and at least one compound of formula VI,

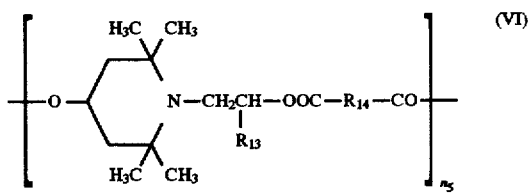

wherein $R_{13}$ is hydrogen or methyl, $R_{14}$ is a direct bond or $C_1C_{10}$ alkylene and $n_5$ is an integer from 2 to 100, is excluded.

2. A stabilizer mixture according to claim 1, comprising at least one compound of component a) and at least one compound of component b) or c), or comprising at least one compound of component a), b), or c) and at least one compound of component d), or comprising at least one compound of component b) and at least one compound of component c), or comprising at least two compounds of component a).

3. A stabilizer mixture according to claim 1, wherein the compound of formula I is

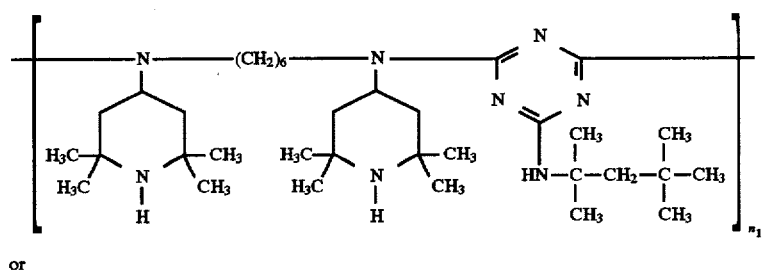

or

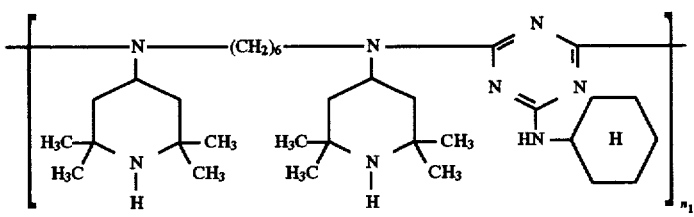

and the compound of formula III is

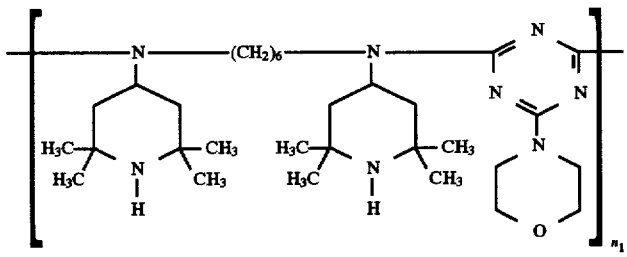

and $n_1$, $n_2$, $n_4$, and $n_4*$ are each independently of one another an integer from 2 to 20.

4. A stabilizer mixture according to claim 1, comprising the compounds

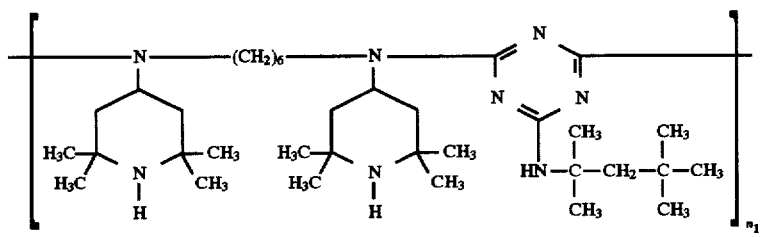

and

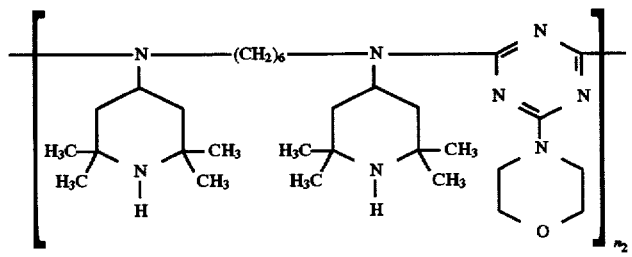

wherein $n_1$ and $n_2$ are each independently of the other an integer from 2 to 20.

5. A stabilizer mixture according to claim 1, wherein component c) is a product obtainable by reacting a product, obtained by reacting a polyamine of formula

with cyanuric chloride, with a compound of formula

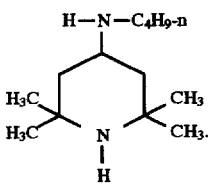

6. A stabilizer mixture according to claim 1, comprising the compound

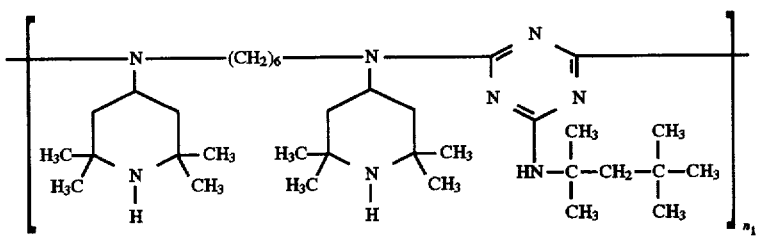

wherein $n_1$ is an integer from 2 to 20, and
a product obtainable by reacting a product, obtained by reacting a polyamine of formula

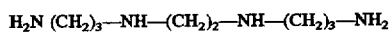

with cyanuric chloride, with a compound of formula

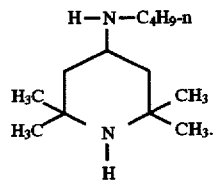

7. A stabilizer mixture according to claim 1, comprising a mixture of compounds Va and Vb, and the compound

8. A stabilizer mixture according to claim 1, comprising a mixture of compounds Va and Vb, and a product obtainable by reacting a product, obtained by reaction of a polyamine of formula

with cyanuric chloride, with a compound of formula

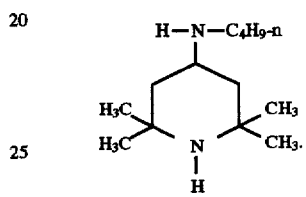

9. A stabilizer mixture according to claim 1, comprising the compound

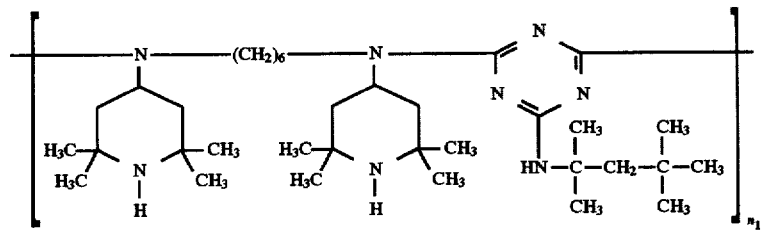

or

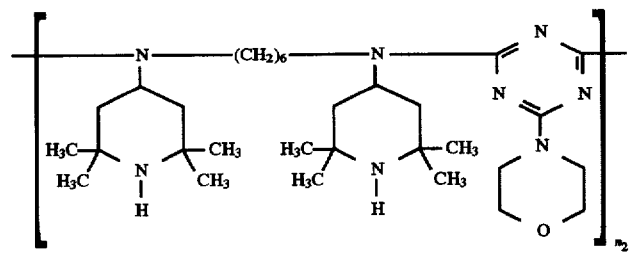

wherein $n_1$ and $n_2$ are each independently of the other an integer from 2 to 20.

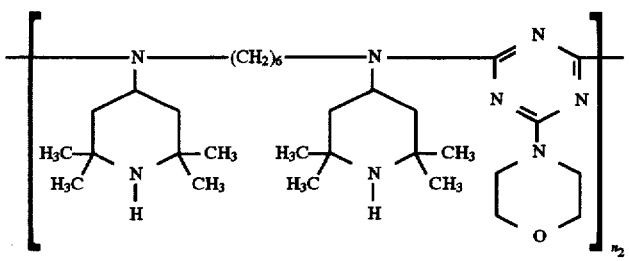

wherein $n_2$ is an integer from 2 to 20, and
a product obtainable by reacting a product, obtained by reaction of a polyamine of formula

with cyanuric chloride, with a compound of formula

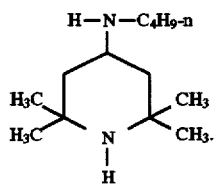

10. A composition comprising an organic material susceptible to oxidative, thermal, or light-induced degradation, and a stabilizer mixture as claimed in claim 1.

11. A composition according to claim 10, wherein the organic material is a polyolefin.

12. A composition according to claim 10, wherein the organic material is polyethylene, polypropylene or a copolymer of polyethylene or polypropylene.

13. A method of stabilizing an organic material susceptible to oxidative, thermal, or light-induced degradation, which comprises incorporating therein a stabilizer mixture as claimed in claim 1.

* * * * *